INVENTOR.
Arnold M. Bartz
BY Earl D. Ayers
AGENT

INVENTOR.
Arnold M. Bartz
BY Earl D. Ayers
AGENT

United States Patent Office 3,287,557
Patented Nov. 22, 1966

3,287,557
OPTICAL ABSORPTION CELL FOR GAS CHROMATOGRAPH EFFLUENT ANALYSIS HAVING GAS HEATING MEANS
Arnold M. Bartz, Midland, Mich., assignor to The Dow Chemical Company, Midland, Mich., a corporation of Delaware
Filed Mar. 2, 1964, Ser. No. 348,682
4 Claims. (Cl. 250—43.5)

This invention relates to cell assemblies for use with infrared spectrometers, and particularly to such cells which are adapted for use in conjunction with gas chromatographic apparatus.

The combination of gas chromatography and infrared spectroscopy provides a powerful analytical tool. Usually, the effluent of a gas chromatographic apparatus is collected as each fraction leaves the apparatus, the fractions being condensed and each transferred to or stored in a suitable container, such as a microcell, for example.

The individual fractions are then analyzed with an infrared spectroscope.

The above method, however, is slow to use in that a substantial amount of time is required to collect the fraction, transfer it to another instrument and then run the spectrum. Further, contamination of the sample by water, for example, is a problem. Another problem in connection with the above described method is that some sample fractions are too intense (totally absorbing) and must be diluted before a useful spectrum may be obtained. Materials used to dilute and transfer the fraction must dissolve the sample and be transparent to infrared radiation. Materials satisfying both requirements cannot always be found.

Another method of approach to the problem of obtaining an infrared spectra of a fraction is the so-called attenuated total reflectance method in which a sample is condensed on a surface of a prism and light is passed through the prism from another surface. The result is a spectrum resembling an infrared spectrum, but this method is slow to use because the prism must be reheated before each sample is run in order to vaporize the previous sample from the surface of the prism. Thus, running a single spectrum usually requires ½ hour.

Accordingly, a principal object of this invention is to provide an improved optical absorption cell assembly for gas chromatograph effluent analysis.

Another object of this invention is to provide an improved optical absorption cell assembly for gas chromatograph effluent analysis in which the sample is utilized in vapor form.

A further object of this invention is to provide an improved optical absorption cell assembly for gas chromatograph effluent analysis which requires a small sample volume for effective use thereof.

Still another object of this invention is to provide an improved optical absorption cell assembly for gas chromatograph effluent analysis in which contamination of the sample is effectively minimized.

An auxiliary object of this invention is to provide an improved, easy to clean, optical absorption cell for gas chromatograph effluent analysis and the like.

In accordance with this invention there is provided an elongated metal bar-like assembly having a narrow slot extending therethrough from end to end. The bar-like assembly is made of a pair of generally L-shaped bar sections which are secured together to form a slotted assembly having an axially disposed slot extending from end to end. The inner surfaces of the slot are highly reflective and the "abutting" surfaces of the L-shaped bar sections are ground flat and polished whereby an effective low pressure seal may be and is achieved when the L-shaped parts are joined together. End plates made of an infrared transmitting material, such as rock salt, for example, are sealed over the ends of the slot. Means are provided for introducing vapor into the cell slot adjacent to one end and for removing vapor from the other end of the slot. Heating means are provided for maintaining the cell at a predetermined temperature and for preheating gases or vapors which are to pass through the cell.

The invention, as well as additional objects and advantages thereof, will best be understood when the following detailed description is read in connection with the accompanying drawings, in which.

Figure 1:
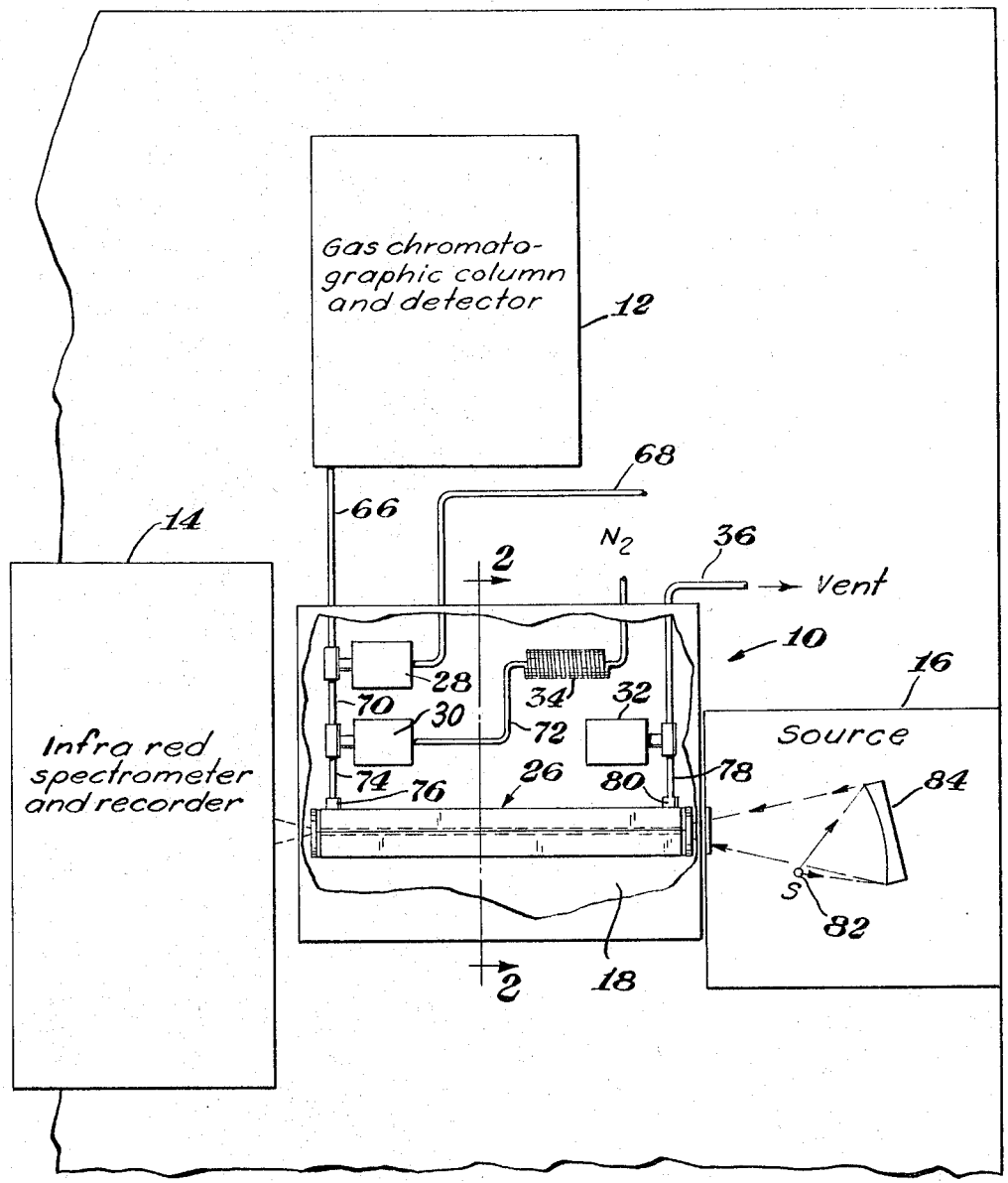
FIG. 1 is a diagrammatical view of analytical apparatus including a cell assembly in accordance with this invention.

Referring to the drawing, and particularly to FIG. 1, there is shown a diagrammatical view of a cell assembly in accordance with this invention as used in conjunction with a gas chromatographic column and detector 12 and an infrared spectrometer 14, and light source 16.

Figure 2:
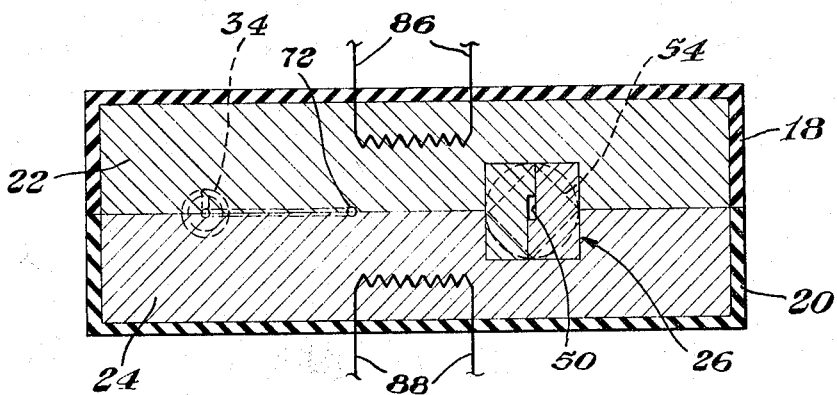
FIG. 2 is a sectional view taken along the line 2—2 of FIG. 1.
Figure 3:
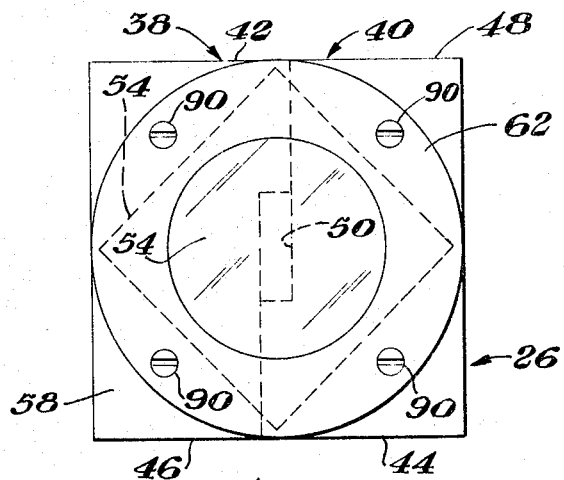
FIG. 3 is an end view of the cell shown in FIG. 1.
Figure 4:
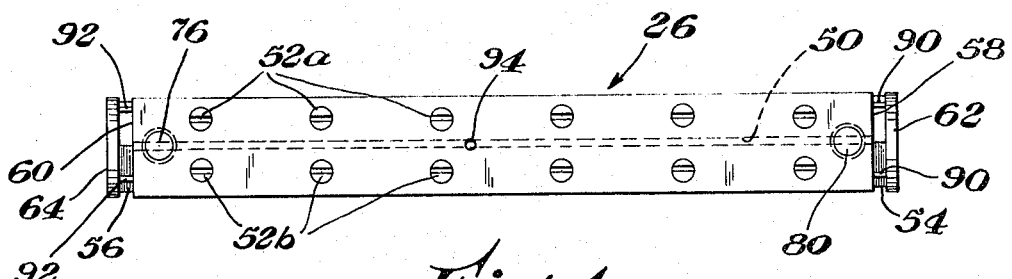
FIG. 4 is a side elevational view of the cell shown in FIG. 1.

The optical absorption cell assembly 10 (referring to FIGS. 2, 3, and 4 as well as to FIG. 1) comprises a thermally insulating outer casing made of phenol formaldehyde, for example, having a top section 18 and bottom section 20, a two piece heater block assembly including as top section 22 and bottom section 24, an optical absorption cell, indicated generally by the numeral 26, solenoid valves 28, 30, 32, a heating coil 34 and associated tubing leading to the gas chromatographic column 12, a nitrogen or other inert gas purging source (not shown) and a vent tube 36. The heating block assembly sections, made of metal, such as magnesium, for example, are grooved to permit the cell 26, solenoid valves, heater coil, and the interconnecting tubing to be sandwiched between the joined together top and bottom sections 22, 24.

Referring to the cell 26, it may be seen (see especially FIGS. 3 and 4) that the cell body is composed of a pair of elongated metal segments 38, 40 each having a somewhat L shaped transverse cross-sectional configuration. The base, or thickest, transverse part 42 or 44 of each of the segments 38, 40 are of equal thickness. Likewise, the length and width of the stem part 46 or 48 of the L are equal in thickness.

The two segments 38, 40, when placed together with the base part of the L of one segment abutting against the stem or thinner part of the other segment, form a composite block having a slot 50 of rectangular transverse cross-sectional configuration extending through the length of the segments 38, 40. The wall surfaces of the slot 50 are polished to a surface finish of about two microinches to provide highly reflective surfaces. The abutting surfaces of the segments 38, 40 are precision ground to approximately 10 microinch finish, whereby the segments 38, 40 may be joined without using a gasket for an adequate low pressure seal.

The segments 38, 40 are secured together by means of the rows of screws 52a, 52b.

Rock salt windows 54, 56 are held against the ends 58, 60 of the cell body by means of annular clamping elements 62, 64 which are held against the ends by bolts 90, 92, respectively. A sealant material which is capable of withstanding the temperatures at which the cell is operated is usually disposed between the rock salt window and the end of the cell body.

The windows 54, 56 may be made of any material which can withstand temperature changes encountered in the operation of the instrument assembly and which transmit infrared radiation. Potassium bromide, for example, may be used instead of rock salt.

A suitable sealant material which may be used between the windows 54, 56 and the ends of the cell body is Dow Corning RTV–731 silicone rubber. Alternatively, and especially for use at higher temperatures, metal seals may be substituted.

Referring to FIG. 1 again in more detail, the effluent of the vapor phase chromatographic column and detector 12 is coupled to the solenoid valve 28 of the cell assembly of this invention by means of a tube 66. The solenoid valves 28, 30 are two-way valves in that in one position flow is in a straight line past the valve and in the other position flow is through the valve and out through one of the "straight line flow" ports of the valve. A vent line 68 is coupled to the single port at one end of the valve 28 and a tube 70 is coupled between the double ended port part of the valve 28 and the double ended port part of the valve 30. A tube 72 is coupled between the heater tube 34 and the single port at the end of the valve 30.

A tube 74 is coupled between the double ended port of the valve 30 and the input port 76 of the cell 26. A tube 78 is coupled between the output port 80 of the cell 26 and a port of the solenoid valve 32, the valve 32 being a simple flowthrough-no flowthrough type of valve.

In operation, light from the source 16 (which includes the light source 82 such as a nernst glower, for example, and concave mirror 84 in a suitable housing) is directed through the slot 50 in the infrared absorption cell and then into a suitable infrared spectrometer 14.

Assuming that the absorption cell 26 has previously been purged with nitrogen or other inert gas, and with the valve 32 open, the valves 28 and 30 are positioned to permit effluent to pass from the column and detector 12 through the tubes 66, 70, and 74 through the cell input port 76. When enough of the sample is in the slot 50 in the cell 26, the valve 32 is closed to prevent flow from the output of the cell (or rather to prevent flow past the valve 32) and the valve 28 is positioned to divert any effluent from the gas chromatographic column and detector through the valve 28 and to vent through the tube 68.

Since the heating block assembly is heated by means of resistance heating elements shown symbolically by the resistances 86 and 88, the infrared absorbing cell 26 is also heated, both being heated to a temperature above the temperature at which the VPC effluent condenses.

With the vaporized effluent trapped in the heated cell and in the adjacent heated tubes 74, 70 and 78, the light from the source passes through the vapor which lies between the highly reflecting wall surfaces of the slot 50, through the rock salt window 56, and into the spectrometer 14 where the spectrum is recorded.

When another effluent sample is to be analyzed, the valve 32 is positioned to coupled the cell slot 50 and tube 78 to the vent tube 36. The valve 30 is then positioned to flow nitrogen or other inert purge gas through the heater 34, line 72, line 74, through the slot 50, and to vent through the lines 78 and 36. The small volume of the slot 50 permits rapid purging by the nitrogen which is heated by the heater coil 34 to prevent cooling of the apparatus to the point where condensation of the sample may occur in the apparatus. The valve 30 is then positioned to cut off flow from the line 72, and to permit flow from line 70 through line 74 and through the cell slot 50. The valve 28 is then positioned to flow additional effluent through the line 66, line 70, etc., through the cell slot 50 until the desired sample vapor is disposed within the cell slot 50. The valve 32 is then closed and the valve 28 positioned to by-pass any additional effluent from the tube 66 to the vent tube 68 while the same vapor trapped in the cell slot 50 is analyzed.

Further samples are analyzed after the cell slot 50 has been purged of the previous sample and re-filled as described above.

One cell built and tested has inside slot dimensions of ⅛ inch by ½ inch by 12 inches of length, defining a volume of approximately 12 cc. The segments 38, 40 are made of nickel because that metal has good corrosion resistance and high polishability. A bore 94 is provided so that a temperature sensing element (not shown) may be embedded in the cell structure. While a cell having a length of 12 inches is practical where sizeable amounts of components (0.5 milligram or more, for example) are present in the sample, longer cells may be required for analysis of certain smaller components.

What is claimed is:
1. An infrared absorption cell assembly for use with a spectrometer, comprising an elongated bar-like member having a walled slot extending axially through it from end to end, said slot being long as compared with its maximum cross-sectional dimension, the walls of the slot being highly polished, each end of said slot in said bar-like member having an infrared transmitting closure element sealed thereto, means for introducing flowable gas-like material into said slot, means for withdrawing a vapor sample from said slot at a position remote from said means communicating with said slot for introducing flowable gas-like material, means for sequentially applying vapor samples to and retaining said samples in said slot for predetermined time intervals and then urging a purge gas through said slot, and means for heating said bar-like member and said means for sequentially applying and retaining vapor samples in said slot and for urging a purge gas through said slot.

2. An infrared absorption cell assembly in accordance with claim 1, wherein said means for sequentially applying vapor samples to and retaining said samples in said slot for predetermined times and then urging a purge gas through said slot comprises a pair of valves coupled to said means for introducing flowable gas-like materials, one of said pair of valves being coupled to a sample line and the other of said pair of valves being coupled to a purge gas line, and a valve coupled to said means for withdrawing gas-like materials from said slot.

3. An infrared absorption cell assembly in accordance with claim 1, wherein said means for heating includes thermostatic temperature control means.

4. An infrared absorption cell assembly in accordance with claim 1, wherein said bar-like member and said means for sequentially applying and retaining vapor samples in said slot and for urging a purge gas through said slot are sandwiched between electrically heated metal blocks, said blocks being disposed in a thermally insulating housing.

References Cited by the Examiner

UNITED STATES PATENTS

| | | | |
|---|---|---|---|
| 2,709,751 | 5/1955 | Meyer | 250—43.5 |
| 2,970,512 | 2/1961 | Waters et al. | 250—43.5 |
| 3,067,327 | 12/1962 | Scott et al. | 250—43.5 |
| 3,120,608 | 2/1964 | Bird | 250—43.5 |

RALPH G. NILSON, *Primary Examiner.*

A. L. BIRCH, *Assistant Examiner.*